(12) United States Patent
Mokamati et al.

(10) Patent No.: US 12,085,464 B1
(45) Date of Patent: Sep. 10, 2024

(54) SYSTEM AND METHOD FOR MEASURING PRESSURE INSIDE PIPELINES OR PRESSURE VESSELS

(71) Applicant: Vanmok Inc., Edmonton (CA)

(72) Inventors: Satya Mokamati, Edmonton (CA); Michael Roxas, Edmonton (CA); Naveen Kumar, Chennai (IN); Mallina Venkata Timmaraju, Chennai (IN)

(73) Assignee: VANMOK INC., Edmonton (CA)

( * ) Notice: Subject to any disclaimer, the term of this patent is extended or adjusted under 35 U.S.C. 154(b) by 0 days.

(21) Appl. No.: 18/591,890

(22) Filed: Feb. 29, 2024

(51) Int. Cl.
*G01L 11/02* (2006.01)

(52) U.S. Cl.
CPC .................. *G01L 11/02* (2013.01)

(58) Field of Classification Search
CPC ......... G01L 11/02; G01L 1/242; G01L 1/246; G01L 13/025; G01L 11/025; G01L 1/243; G01L 9/0007
See application file for complete search history.

(56) References Cited

U.S. PATENT DOCUMENTS

| | | | |
|---|---|---|---|
| 5,218,197 A * | 6/1993 | Carroll | G01L 9/0007 250/227.21 |
| 8,418,529 B2 | 4/2013 | Coudray et al. | |
| 8,873,064 B2 | 10/2014 | Tapanes | |
| 9,395,242 B2 | 7/2016 | DiGiovanni et al. | |
| 2011/0035418 A1 | 2/2011 | Butler, IV | |
| 2011/0102803 A1 | 5/2011 | Wang et al. | |
| 2012/0224182 A1 * | 9/2012 | Tapanes | G01N 21/8806 356/477 |

FOREIGN PATENT DOCUMENTS

| | | | | |
|---|---|---|---|---|
| CN | 202252869 U | 5/2012 | | |
| CN | 102997045 B | 3/2013 | | |
| CN | 102997053 B | 3/2013 | | |
| CN | 102997055 A | 3/2013 | | |
| CN | 102997062 B | 3/2013 | | |
| CN | 103047541 A | 4/2013 | | |
| CN | 204756463 U | 11/2015 | | |
| CN | 212585730 U | 2/2021 | | |
| WO | WO-2006004419 A1 * | 1/2006 | | G01L 11/025 |

* cited by examiner

*Primary Examiner* — Andre J Allen
(74) *Attorney, Agent, or Firm* — FIELD LLP

(57) ABSTRACT

A system and method for measuring pressure inside a pipeline or pressure vessel is disclosed. The system includes one or more units locatable around an external surface of the pipeline or vessel, each unit containing: a light source for generating a light beam; a single fiber Mach Zehnder interferometer (SF-MZI) sensor bendable against an outer surface of the pipeline or vessel, for receiving the light beam; a light receiver for receiving the light bean from an output of the SF-MZI sensor, said light receiver including an optical spectral analyzer; and a local processor for signal conversion; a data acquisition system associated with each of the one or more units to provide power to the elements of the unit; and a central processor in communication with each of the local processors of each of the units, said central processor containing stored strain data, and the stored bend induced birefringence data.

19 Claims, 8 Drawing Sheets

Data Acquisition System

Pressure Patch

Fiber Optic Cable

Exploded view of installation showing the Fiber optic cable Installed on the pipeline.

Exploded view of installation showing the Fiber optic cable installed on the pipeline.

SYSTEM AND METHOD FOR MEASURING PRESSURE INSIDE PIPELINES OR PRESSURE VESSELS

FIELD

The present disclosure generally relates to the field of leak detection in pipelines, and more particularly relates to a system and method for measuring pressure inside a pipeline or any pressure vessel, be it cylindrical or spherical using non-intrusive sensors.

BACKGROUND

Pipelines are used for the transport of fluids, both for industrial applications over long distances and for distribution systems when a given fluid must be delivered to a large number of users or processes via a pipeline network. However, pipeline leaks are widely prevalent and can be caused by several issues like fatigue cracks, tensile strength tears, material manufacturing errors and acting of an external force from the outside of the pipeline.

Acoustic leak detection techniques are frequently used for detecting leaks and focus on noise created by leaks in pressurized systems. Acoustic sensors are placed on the outside of pipes to pick up this distinct sound, allowing operators to pinpoint leak location. However, this method suffers from a high false alarm rate and reduced sensitivity and tends to fail to distinguish other types of transient noises, such as noises from pumps, compressors, and valve operations that produce signals with patterns and amplitudes similar to the patterns and amplitudes of such signals produced by leaks.

The use of optic fiber cables for the external detection and monitoring of leaks is based on the physical changes that occur at the leak site. One such physical change is a change in temperature profile. To detect such changes, the fiber optic cable is placed along the pipeline. A laser emits pluses, or photons that are reflected by molecules in the fiber optic cable. The magnitude of these reflected laser pulses gives insight as to the temperature at the place where the photons hit the molecules. By adding the reflection magnitudes, a temperature profile can be created to detect the characteristic change in temperature that occurs at the leak site.

In the field of non-intrusive pressure sensing, optic fiber technology has been widely implemented in the form of fiber Bragg gratings (FBG) and long-period fiber gratings-based inline interferometers, due to the ability of multiplexing several sensors. However, these sensors are expensive to fabricate.

Mach-Zehnder interferometers (MZI) are used for measuring pressure inside the pipeline. The Mach-Zehnder interferometer is a simple highly configurable device used to demonstrate interference by division of amplitude. A beam splitter is used to split a light beam into two parts. The split beam is then recombined by a second beam splitter. Based on the relative phase acquired by the beam along the two paths, the second beam splitter will reflect the beam with an efficiency between 0 and 100%. Inline fiber MZI with single arm are more commonly used over two arms fiber MZIs as single arm fiber MZI is considered a more stable configuration.

In US 2011/0102803, an in-line single fiber Mach-Zehnder interferometer was achieved by creating a cavity inside a core and a cladding region of the optical fiber. The guided light beam traversing the fiber splits into two beams such that one of the beam traverses as guided and the other beam becomes unguided as it propagates through the cavity region. The accumulated phase difference between two beams is exploited to realize a refractive index sensor. The MZI fabrication process in this document includes creating cavity in the fiber instead of tapering the fiber. However, in actuality, it is difficult to create a cavity inside the fiber and it can cause loss of optical power. The arrangement of this reference can make it difficult to precisely excite higher order modes in a repeatable manner. This technology establishes only a single point for light disturbance.

In US 2011/035418, a single-fiber MZI is disclosed which is produced by fuse tapering an un-jacketed region of an optical fiber at two places. The core and the cladding modes propagating through core and cladding regions accumulate the phase difference resulting in wavelength filtering action at its output for Dense wavelength-division multiplexing (DWDM) networks. The two necks of the MZI plays role in splitting and combining the interfering modes. The two necks of the MZI play a role in splitting and combining the interfering modes. However, this document fails to specify the role of fiber between the two tapered regions in terms of free spectral range of the filter. Moreover, it also fails to disclose whether the fiber between the two necks is unjacketed or jacketed. Further, it fails to disclose the application of the single-fiber MZI for the purposes of sensing of fluid flow rate and bend induced compression and expansion of the pipe. Impact of adiabaticity on sensor performance is not discussed. The effect of interference length, fringe width in sensing application is also not mentioned. Calibration and characterization of non-adiabatic SFMZI is also not defined. Even in fabrication process, adiabatic/non-adiabatic taper fabrication condition is not defined.

As per U.S. Pat. No. 9,395,242B2 which discloses a single-fiber MZI sensor realized by multiple tapers for developing a broad band fiber sensor array to measure different multiple parameters which are assumed to be independent of each other. This reference does not apply to measuring fluid flow rate or sensing of expansion and contraction of the pipe due to fluid flow and therefore there is no teaching of the role of bend induced birefringence on the fringe shift.

In U.S. Pat. No. 8,873,064 which teaches a fiber-optic sensor that can have a Michelson sensor portion and a Mach-Zehnder sensor portion. A first splitter-coupler can be configured to split incoming light between a first fiber portion and a second fiber portion. A first polarization-phase conjugation device is used to conjugate a polarization phase of incident light corresponding to the first fiber portion, and a second polarization-phase conjugation device can be configured to conjugate a polarization phase of incident light corresponding to the second fiber portion. Each of the first and second polarization-phase conjugation devices can be configured to reflect light toward a detector and through the respective first and second fiber portions. A coupler is used to join light in the first fiber portion with light in the second fiber portion, and a third fiber portion can be configured to receive light from the coupler and to illuminate a second detector. There is no teaching of the use of artificial intelligence or of ways of calibrating the sensor device.

In CN212585730U which teaches a distributed optical fiber sensor for leakage point detection of a pipe network system and comprises a narrow linewidth laser, an optical fiber amplifier, an acousto-optic modulator, a circulator, a first coupler, a sampling optical fiber, a delay optical fiber, a second coupler and a detector. According to the technical scheme, the conformance distributed optical fiber sensor based on the Rayleigh Mach-Zehnder optical fiber optical path is provided, phase noise of Rayleigh scattering is effectively filtered out through the interference effect of the Mach-Zehnder optical fiber, system detection sensitivity and spatial resolution are considered at the same time.

In CN204756463U which teaches an optical fiber detection system for natural gas line leak detection, including central processing unit and optic system. The central processing unit includes wireless communication module, signal receive module, line map storage and analysis module. The central processing unit is connected with alarms and display screens. The optic system includes a light source and a plurality of optical fiber sensors; every optical fiber sensor is connected with a light path adapter, and optical fiber sensors are connected on a natural gas line.

In U.S. Pat. No. 8,418,529 teaches a device for conveying a substance that comprises: a first duct for containing the substance; an optical fiber connected to the first duct and extending along the duct, the optical fiber including several detection members spaced along its length, each detection member having a separate reflection spectrum that varies with the presence of the substance to be detected; a control device including a light source capable of emitting a light in the reflection spectrum of each detection member, a light receiver capable of detecting the light amplitude in the detection spectrum of each detection member, and an analysis module capable of determining the presence of a leak of the substance based on the light amplitude provided by the light receiver.

In CN103047541A and related prior arts, variations on a natural gas pipeline leakage monitoring systems and methods based on fiber sensing is disclosed. It comprises a light path system and a circuit, wherein fiber sensors are installed on the pipeline body at certain intervals; a plurality of adjacent fiber sensors constitute a fiber sensor group; each fiber sensor group shares one transmitting fiber to be connected with a light source; each fiber sensor group uses one return fiber to be connected with a photoelectric detector; the output of the photoelectric detector is connected with a signal acquisition and processing module with leakage signal identification and event location functions; and the output of the signal acquisition and processing module is connected with a microcomputer through an external interface.

Thus, it is desirable to provide a non-intrusive pressure sensor to measure pressure within the pipelines. It would be desirable to have a sensor that is readily attachable or easily built into the system without adding obstructions, diaphragm ports, and the like.

Therefore, there arises a need for having a pressure sensing system & method which utilizes non-intrusive sensors and optic fiber cable-based single armed inline Mach-Zehnder interferometers to measure pressure that provide a stable response and robust output in terms of measured pressure inside the pipelines or other pressure vessels, be they cylindrical or spherical.

SUMMARY

A system for measuring pressure inside a pipeline or pressure vessel is disclosed. The system includes one or more units locatable around an external surface of the pipeline or vessel, each unit containing: a light source for generating a light beam; a single fiber Mach Zehnder interferometer (SF-MZI) sensor wrappable and bendable against an outer surface of the pipeline or vessel, for receiving the light beam; a light receiver for receiving the light bean from an output of the SF-MZI sensor, said light receiver including an optical spectral analyzer; and a local processor for signal conversion; a data acquisition system associated with each of the one or more units to provide power to the elements of the unit; and a central processor in communication with each of the local processors of each of the units, said central processor containing stored pipeline or vessel strain data, and the stored bend induced birefringence data. The optical spectral analyzer is configured to detect a change in spectral pattern of light travelling from the light source through the SF-MZI sensor, said spectral pattern change corresponding to a change in pressure within the pipeline or vessel. The central processor is configured to process the spectral pattern changes to calculate changes in strain in the pipeline or vessel and to calculate bend induced birefringence of the SF-MZI and is further configured to calibrate the calculated change in strain values by comparing the calculated strain data to the stored strain data and further calibrates the calculated bend induced birefringence values by comparing the calculated bend induced birefringence to the stored bend induced birefringence data, to determine whether a change in pressure has occurred within the pipeline or vessel.

A method of for measuring pressure inside a pipeline or pressure vessel is also disclosed. The method comprises the steps of: bending and wrapping a SF-MZI sensor around the pipeline or vessel; injecting a light beam into an input of the SF-MZI sensor and allowing the light to travel through a first tapered region, an un-tapered interference region and a second tapered region of the SF-MZI sensor; receiving the light beam from an output of the SF-MZI sensor into an optical spectral analyzer; detecting, by the optical spectral analyzer any change in a spectral pattern in real-time; processing the spectral pattern changes to calculate changes in strain in the pipeline or vessel; calculating bend induced birefringence of the SF-MZI; calibrating the calculated change in strain values by comparing the calculated strain data to the stored strain data; and calibrating the calculated bend induced birefringence values by comparing the calculated bend induced birefringence to the stored bend induced birefringence data, to determine whether a change in pressure has occurred within the pipeline or vessel.

A characterization method for calibration of an SF-MZI sensor wrapped around a pipeline or vessel for sensing changes in pressure within the pipeline or vessel is further disclosed. The characterization method includes the steps of: generating a unique number; and assigning the unique number to each configuration of the optical interferometer. The unique number is constant; and the unique number makes the sensing process independent of profiles of tapers constituting the optical interferometer.

BRIEF DESCRIPTION OF THE DRAWINGS

Various objects, features and advantages of the disclosure will be apparent from the following description of embodiments of the disclosure, as illustrated in the accompanying drawings. The drawings are not necessarily to scale, emphasis instead is placed upon illustrating the principles of various embodiments of the disclosure. Similar reference numerals indicate similar components.

DETAILED DESCRIPTION

Various aspects of the disclosure will now be described with reference to the figures. For the purposes of illustration, components depicted in the figures are not necessarily drawn to scale. Instead, emphasis is placed on highlighting the various contributions of the components to the functionality of various aspects of the disclosure. A number of possible alternative features are introduced during the course of this description. It is to be understood that, according to the knowledge and judgment of persons skilled in the art, such alternative features may be substituted in various combinations to arrive at different embodiments of the present disclosure.

Rationale

The present disclosure is a portable non-intrusive pressure-sensing system using optical fiber cable MZI interferometer technology that can be attached to an exterior of the pipe.

A system for measuring pressure inside a pipeline or any pressure vessel is disclosed. With reference to FIG. 1C, the system includes a light source for generating a light beam; a single fiber Mach Zehnder interferometer wrapped around an external surface of a pipe or vessel and including one or more sensors that are thus positioned along the external surface of the pipe; and a light receiver including an optical detector or optical spectral analyzer (OSA). When the light source injects the light beam into the interferometer; the optical detector detects the light beam as it emanates from an output of the interferometer and measures any shift in the measured output spectral pattern in real-time.

Figure 1B:
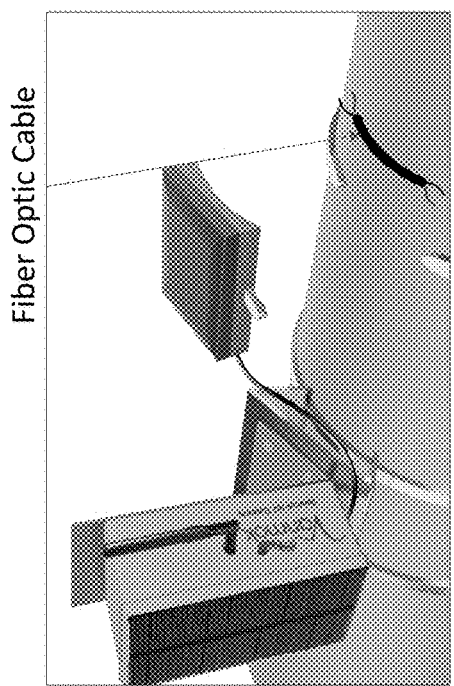
FIG. 1B is a detailed perspective view of a pipe fitted with a system of the present disclosure, showing a detail of the SFMZI.
Figure 1A:
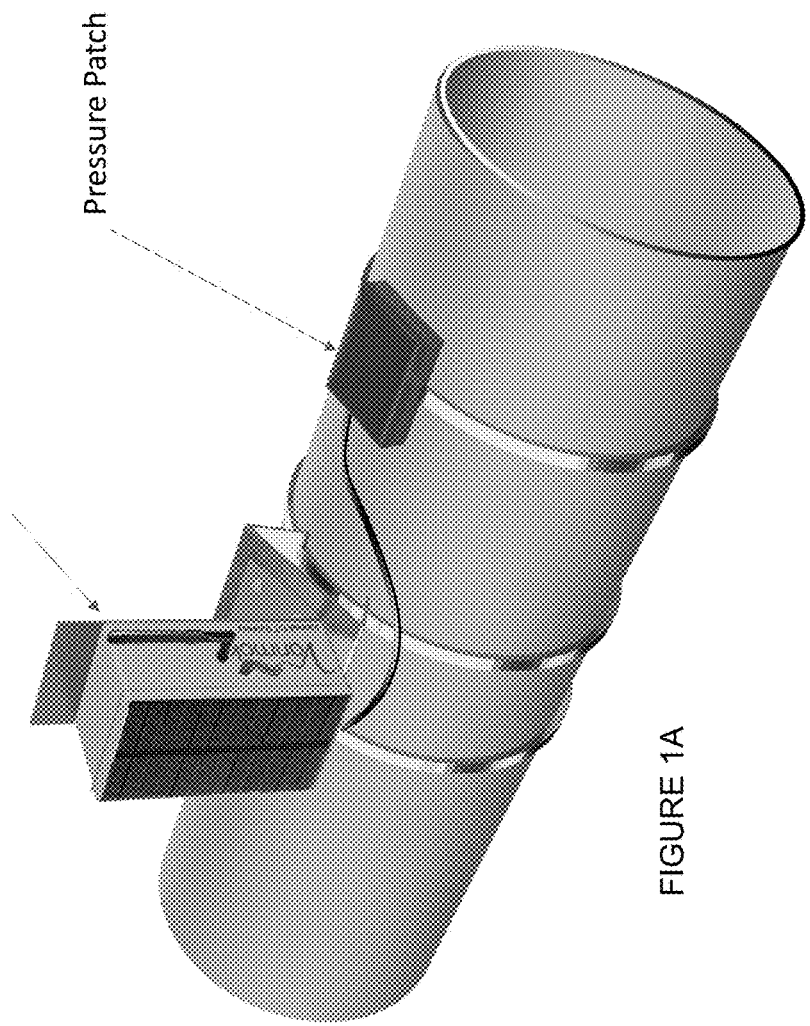
FIG. 1A is a perspective view of a pipe fitted with a system of the present disclosure.
Figure 1C:
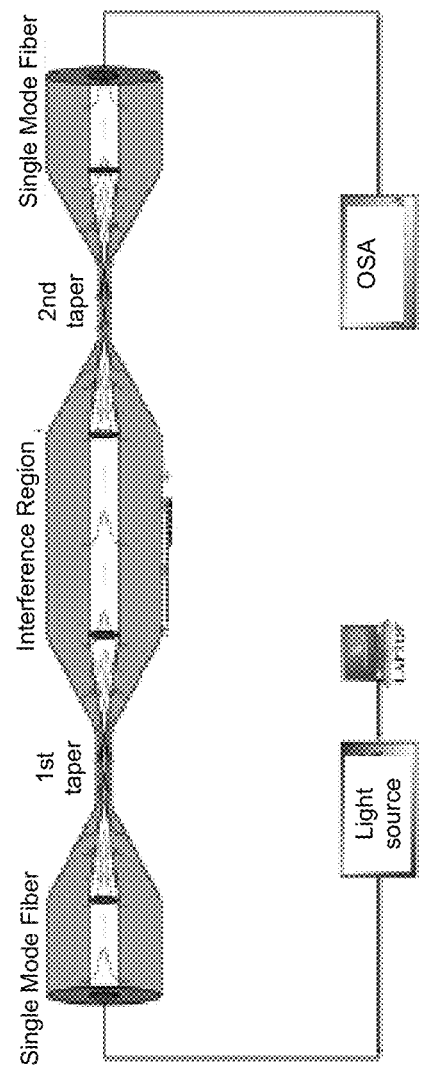
FIG. 1C is a schematic diagram of a structure of an SF-MZI device for use with the present system.

With reference to FIGS. 1A and 1B, the system includes a sealed unit containing hardware including a processor, preferably in the form of printed circuit board (PCB) electronics for signal conversion, the light emitter and light receiver and SF-MZI. The unit is attached to the pipeline is preferably with a watertight seal at its mating surface with the pipe. The unit is preferably secured the pipe with a strap as shown.

The data acquisition system provides a power supply to the elements within the unit and is preferably also mounted on the pipe with a strap and an angle bracket. The data acquisition system can preferably have solar panels to provide power to the elements within the unit at least in part, in which case the data acquisition system can preferably be oriented to face the sun for maximum exposure.

The system measures pressure inside a pipeline or any pressure vessel through one or more interferometer sensors positioned along the external surface of the pipeline. These sensors are connected to a plurality of local processors positioned at corresponding points of interest. The plurality of local processors are further connected to a central processor. The shift in spectral pattern data is then processed by the central processor to determine any change in strain in the pipeline and bend induced birefringence of the optical interferometer. Birefringence is the refraction of light in an anisotropic material into two directions to form two beams.

In comparison to amplitude based measuring methods, fringe contrast based methods often provide more accurate results. Any contraction/expansion in pipe is exhibited in terms of shift in the wavelength/fringe shift as well as change in amplitude of the fringes. Fringe contrast is measured in terms of shift in wave lengths of the peaks and change in peak-to-peak amplitudes. This kind of measurement presents more accurate and reliable sensing parameters.

The central processor processes the change in strain interpreted from the spectral pattern data from the sensors, and the bend induced birefringence; and calibrates the captured change in strain values by comparing the sensed strain measurement to stored strain data and further calibrates the captured bend induced birefringence values by comparing the sensed bend induced birefringence measurement to stored bend induced birefringence data to determine whether a change in pressure has occurred. The stored strain data includes strain data profiles for pressure variations and the stored bend induced birefringence including bend induced birefringence data profiles.

Any contraction/expansion in pipe is exhibited in terms of shift in the wavelength/fringe shift as well as change in amplitude of the fringes. Fringe contrast is measured in terms of shift in wave lengths of the peaks and change in peak-to-peak amplitudes. This kind of measurement presents more accurate and reliable sensing parameters which has not been used/discussed in earlier patents.

The light source is preferably a light-emitting diode (LED) emitting light in the range of 1520 nm to 1570 nm. In real-time, during the normal functioning of the pipeline or pressure vessel, the strain experienced by the bent-SF-MZI sensor changes with changes in the pipe/vessel diameter, even in the range of microns, that are caused by a drop in fluid pressure induced by leakages or by operational changes in the pipeline or vessel.

The MZ interferometer preferably includes at least two non-adiabatic biconical tapered fibers separated by a few centimeters of un-jacketed single-mode fiber and an un-tapered region including the sensor. The present fiber thus has a tapered design at both its start and end, creating a region for interference, which is unlike the prior art. The optical detector has a resolution of less than 0.02 nm.

Axial deformation of the SF-MZI due to tensile stress in the pipe and the bending of SF-MZI around the pipe induces additional birefringence inside the tapered region and un-tapered section of MZI, which results in alteration in the effective indices of the modes propagating through the optical path length. Optical path length or optical interference length herein refers to length of the un-tapered region between the conically shaped tapered regions of the fibers. Mode is a field profile which represents how the amplitude of electric/magnetic field vary inside the fiber. In the center of the fiber core, the amplitude of field is maximum and its value gradually decreases as one moves towards the cladding region. The penetration of the field in the cladding region is known as evanescent tail. The first order mode of the field is also known as fundamental mode.

The modification in the optical path length traversed by the interfering modes affects the wavelength multiplexed output fringe pattern. Thus, variations in pipe diameters induce a shift in the output spectrum of the SF-MZI, which can be observed by an optical spectrum analyzer, due to two types of governing phenomena, specifically bend induced birefringence, and the longitudinal strain found in the SF-MZI sensor. Radial or circumferential deformation of pipeline is captured by the axial deformation of MZI.

There will be multiple wavelength peaks in the output spectrum of SF-MZI. The shift in peaks, towards the lower wavelengths is called a "blue swing". The shift in peaks towards the higher wavelength is called a "red swing". In addition to blue/red swings in multiple peaks, depending on contraction/expansion of the pipe, the output response of the interferometer can include free spectral range (FSR), extinction ratio and peak power at resonant wavelength among other multiplexed wavelengths, which all also undergo corresponding changes with respect to changes in the diameter of the pipe. It has also been observed that the variation in optical path length of the modes also induces influence on FSR of the output fringes in addition to location of the fringes. However, the wavelength shift and change in FSR are correlated to be dependent on each other and are not independently affected by optical path difference (OPD).

A method for estimating the location of leak in a pipeline is disclosed. The method comprises the steps of: characterization of an SF-MZI; calibrating the SF-MZI using the characterization; detecting, by the optical detector, any shifts in a light beam emanating from the output of the SF-MZI to calculate a change in strain in the pipeline; and comparison of captured change in strain values and bend induced birefringence values to stored values to determine whether a leak has occurred.

The present system is developed with an artificial intelligence (AI)/machine learning (ML) learning kit; and includes Internet of Things (IoT)/Cloud components; and software application to monitor real-time pressure measurements.

The characterization is done both in readying the present system for use in the field and also during operational use in the field. The calibration includes calibration at laboratory level prior to use and in the field during operational use. The AI/ML learning kit is developed based on predicted specific usage and applications, and the learning kit will learn autonomously during its usage in a particular application.

The optical receiver/detector detects the light beam emanating from the output of the SF-MZI sensor and transmits this data to an artificial intelligence-coupled network. The central processor, coupled to the AI/ML learning kit, processes the data from the optical detector to determine the corresponding change in strain in the pipe.

While the fringe contrast is an independent parameter, its value depends on bend radius of the wrapped SF-MZI. The present SF-MZI configuration is realized by cascading of two non-adiabatic fiber tapers. The higher order modes, guided as well as non-guided, are excited as the light beam enters the non-adiabatic fiber taper of the SF-MZI configuration.

These modes beat among themselves while traversing through the interference length of the interferometer, resulting in formation of fringes at the output port, which can be observed in terms of filtered spectral response on the optical detector/optical spectral analyzer. Since the beating is happening mainly in the single-mode fiber region of the SF-MZI, the output wavelength response is found to be highly stable. By taking a spatial Fast Fourier transformation (FFT) of the fringe pattern, the number of modes, with relative overlap, excited in the interference length can be ascertained. FTT allows for estimation of how much power is excited in the fundamental mode and how much power is excited in the higher order mode. Usually, two-mode inference is easy to maneuver and presence of the third/higher mode can be adjusted by involving a perturbation term in the first two modes interference.

Since penetration of the evanescent tail of the fundamental mode and the other interfering modes propagating through the interference length of single mode fiber remain well within the cladding region, the influence of external disconcertion like temperature etc. is not very high and the spectral response is quite stable. The main reason behind the stability of the spectrum response is that interfering modes are traversing through the same physical length and whatever minor alteration happens in the properties of the fiber, the same is also transferred to all the modes such that the difference between the amendment in each mode is negligibly small.

The SF-MZI sensor being wound around the pipe, changes in internal pressure of the fluid flowing through the pipe create expansion and tensile stresses in the SF-MZI. The effect is akin to triggering the wrapped SF-MZI with tensile stress which depend on difference of photo-elastic coefficients, Poisson's ratio and also the Young's Modulus in orthogonal directions. In addition, the radius of curvature of the wrapped SF-MZI sensor enacts contrast of the fringes as well as shift in the eccentricity of the conically shaped section defined by the tapered region of the sensor, and the corresponding output response observed by the optical detector/receiver/spectrum analyzer.

The degree of wavelength shift in the spectrum from red to blue is inversely proportional to the gradation of the expansion/compression of the pipe, which can then be correlated with the internal pressure change in the pipe, or leakage from the pipe. From the FFT analysis of the output fringe pattern, the amount of power excitation in the higher order modes can be ascertained. In addition, the fringe contrast and vacillation in eccentricity as a function of internal pressure and leakage can be sent to the processors. Further, due to different taper profiles in terms of symmetry, waist length and diameters, and non-reciprocity, different SF-MZI configurations exhibit different sensitivity to different pipes of different diameters. It becomes pertinent in the context of calibration that SF-MZI sensor display similar sensitivity for change in pressure inside the pipe of different radius.

Thus, in order to achieve same sensitivity for each sensor for a particular diameter or dimension of the pipe, a unique constant for each SF-MZI, depending on its topology, has been determined for a particular diameter of the pipe for each SF-MZI. The methodology adopted for determination of unique constant correlates the geometrical features of each interferometer.

The bend induced birefringence makes changes in the effective index of the interfering modes, leading to shift in the output spectrum. In addition, longitudinal strain may also add some phase in the output spectrum resulting in further shift in the spectrum. The resultant of these effects can be observed in terms of red/blue shifts in the fringes. The shift in the fringes is proportional to the change in the pressure and the fringe contrast is also proportional to the Young's modulus and pressure inside the pipe.

Characterization and Calibration of the Optical Interferometer

A characterization method for calibration of an optical interferometer is disclosed herein. It comprises the steps of generating a unique number; assigning the unique number to each configuration of the optical interferometer; wherein the unique number is constant; and the unique number makes the sensing process independent of profiles of the tapers constituting the optical interferometer.

The unique number is defined in a first pass, to predict the fringe contrast which is related to the pressure inside the pipe provided the value of material Youngs' modulus is provided. The parameter is independent of the geometry of the tapers.

SF-MZI sensor characterization is used to determine the sensitivity of the sensors and to determine any amplitude or temperature corrections required. Sensor performance depends on non-adiabaticity, taper profile, taper length, the interference length and the diameter of the pipe. It becomes important to determine amplitudes of the interfering modes and the phase difference between them as a function of pressure. The calibration of the sensor with respect to its geometrical topology and non-adiabaticity profile also plays important role in its sensitivity and temperature fluctuations.

The interferometer characterization can be done at physical and spectral level.

The devices and methods of the present disclosure can be used for leak detection in pipelines and for measuring pressure inside any enclosed chamber or conduit. Such device can be easily installed on the surface of the pipeline without the need for drilling any holes in the pipeline, thereby resulting into elimination of any operational downtime or additional mechanical attachments in order to measure the internal pressure within the pipeline.

Example of System and Method of Operation

Figure 2:
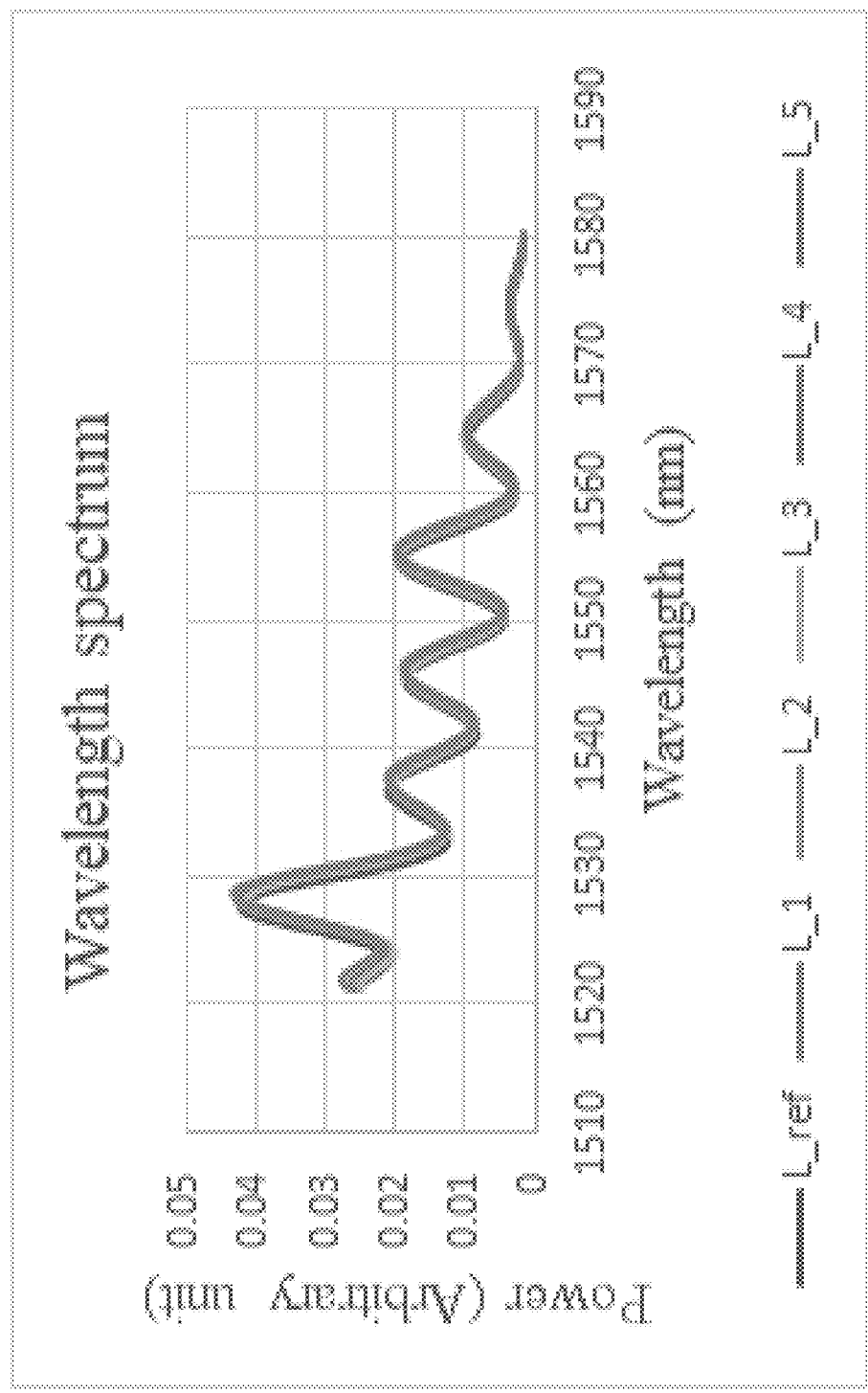
FIG. 2 is a graph showing an example of variations in output spectrum of an SF-MZI used in the present system due to change in diameter of the pipe, as represented by power changes in power of the light being transmitted through the SF-MZI.
Figure 3:
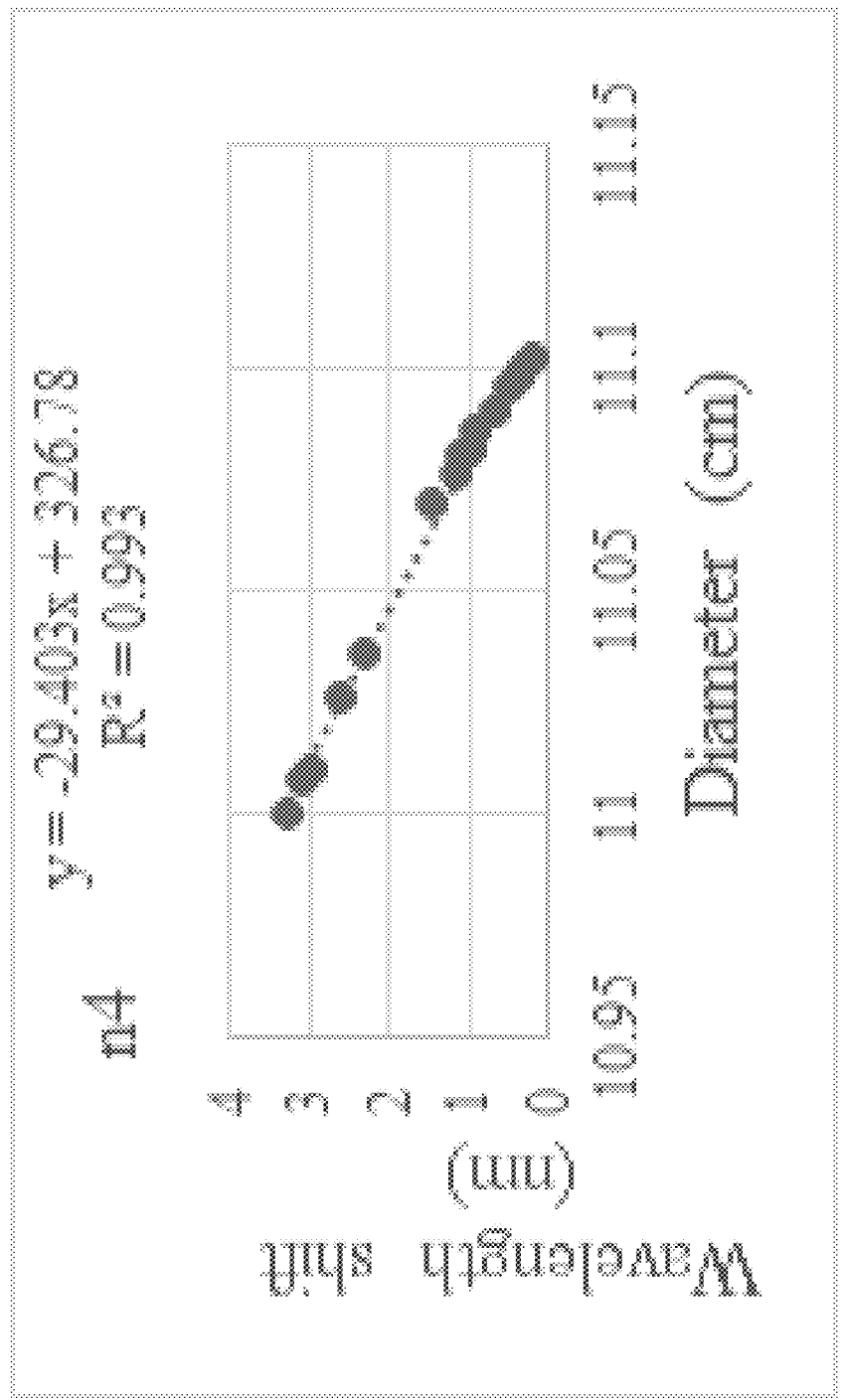
FIG. 3 is a graph showing an example of variation in wavelength shift as a function of pipe diameter as diameter is increased.
Figure 4:
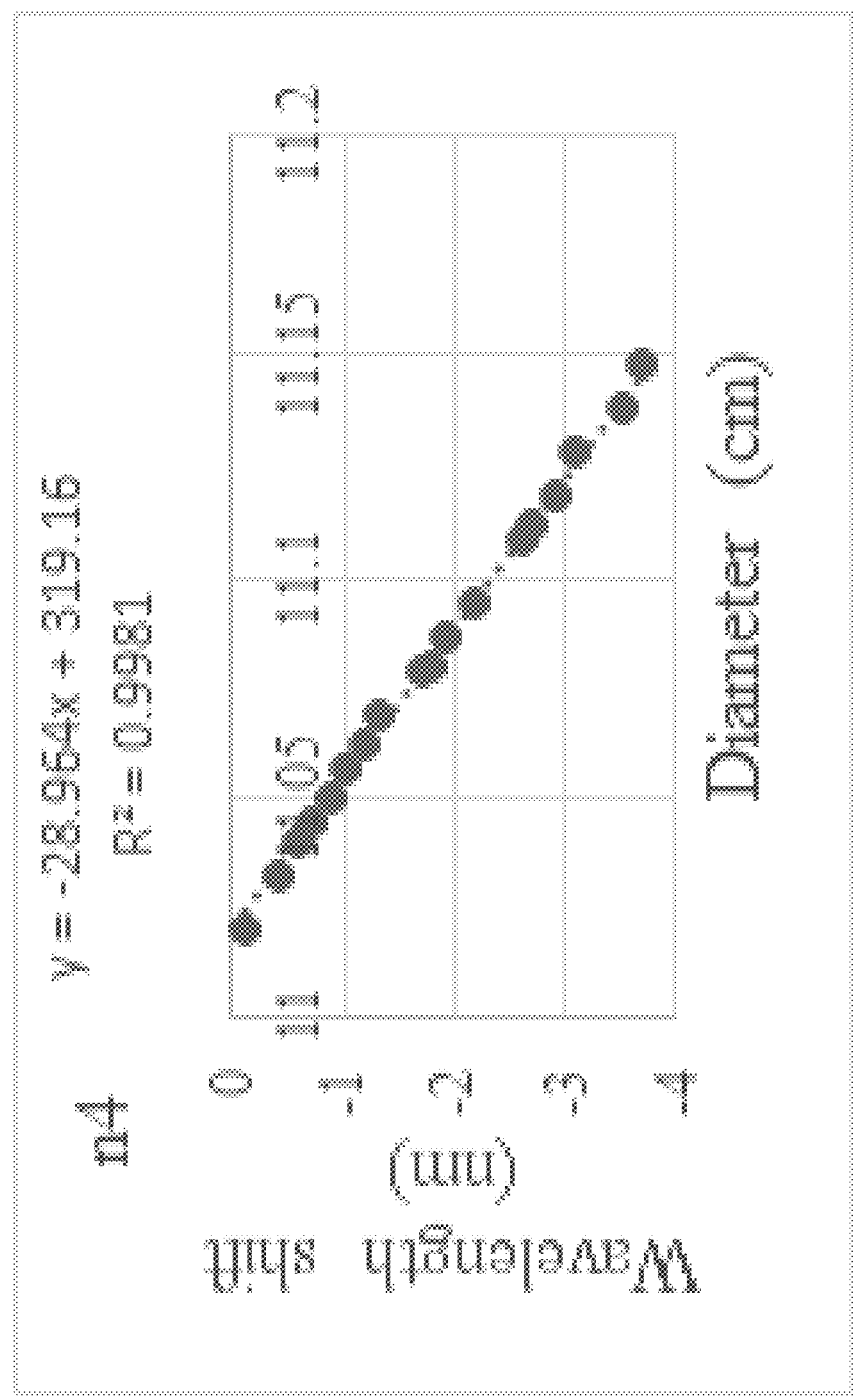
FIG. 4 is a graph showing an example of variation in wavelength shift as a function of pipe diameter as diameter is decreased.

One or more SF-MZI sensors of the present disclosure are wrapped around a pipe and its output port is connected to the optical fiber spectrum. The output spectral responses of the SF-MZIs were observed on the optical spectral analyzer. Erbium doped fiber was used as input broad band light source in C-band. Using a splice machine, input and output ports of SF-MZI were connected to fiber patch cord for injecting input light and recording output spectrum. A resonant wavelength was identified for measuring shift in its output spectrum when placed under strain environment during sensing experiments. The pipe was compressed radially in one direction to decrease its diameter gradually in 2 mm steps. Then compression was released to restore the pipe's dimension to its initial state and the corresponding wavelength shift was also recorded. In both of the above cases, it was found that alteration in resonant wavelength depends linearly on the expansion/compression of the pipe. These are illustrated in FIGS. 2-4.

Figure 5:
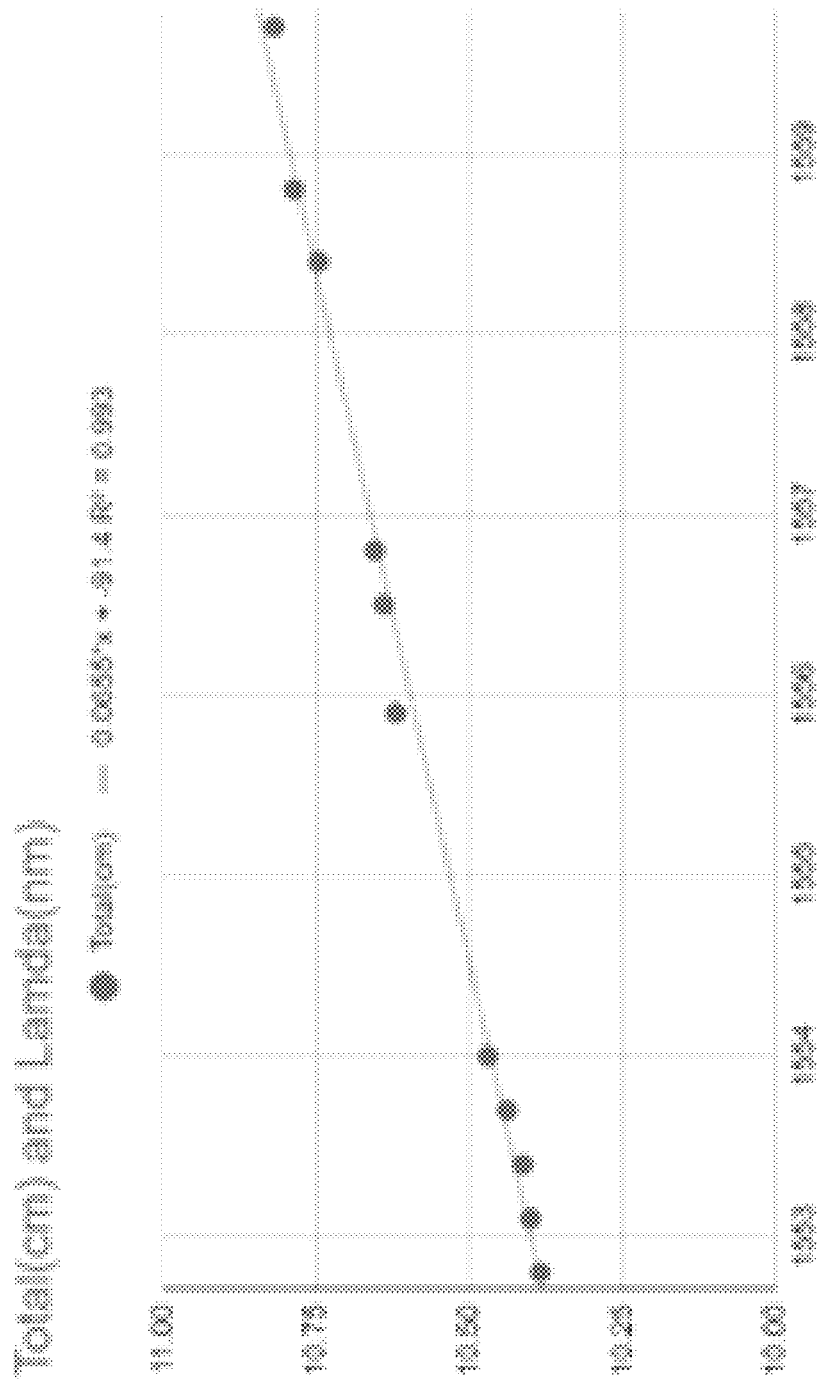
FIG. 5 is a graph showing an example of variations in wavelength due to change in pipe diameter as a function varying strain.
Figure 6:
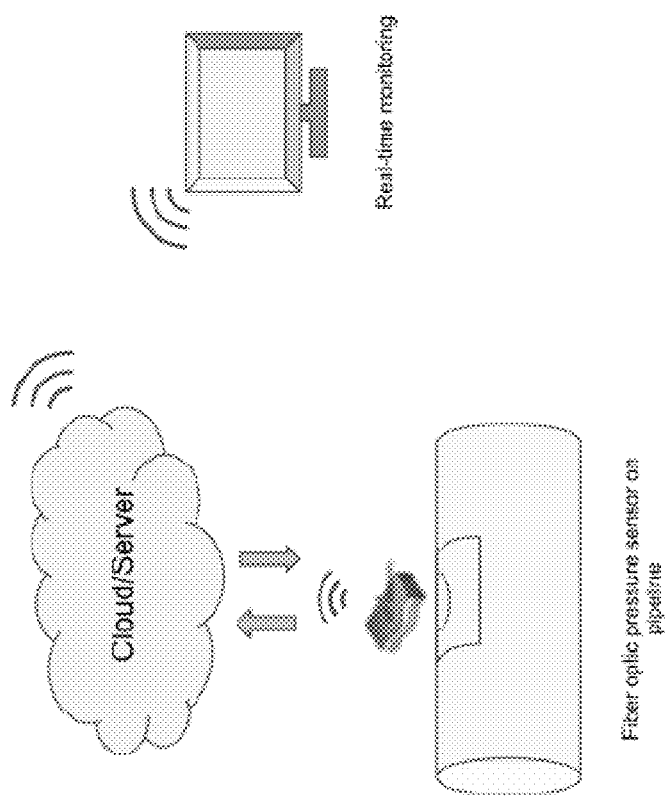
FIG. 6 is a schematic diagram of one embodiment of a communications arrangement of the present system.
Figure 7:
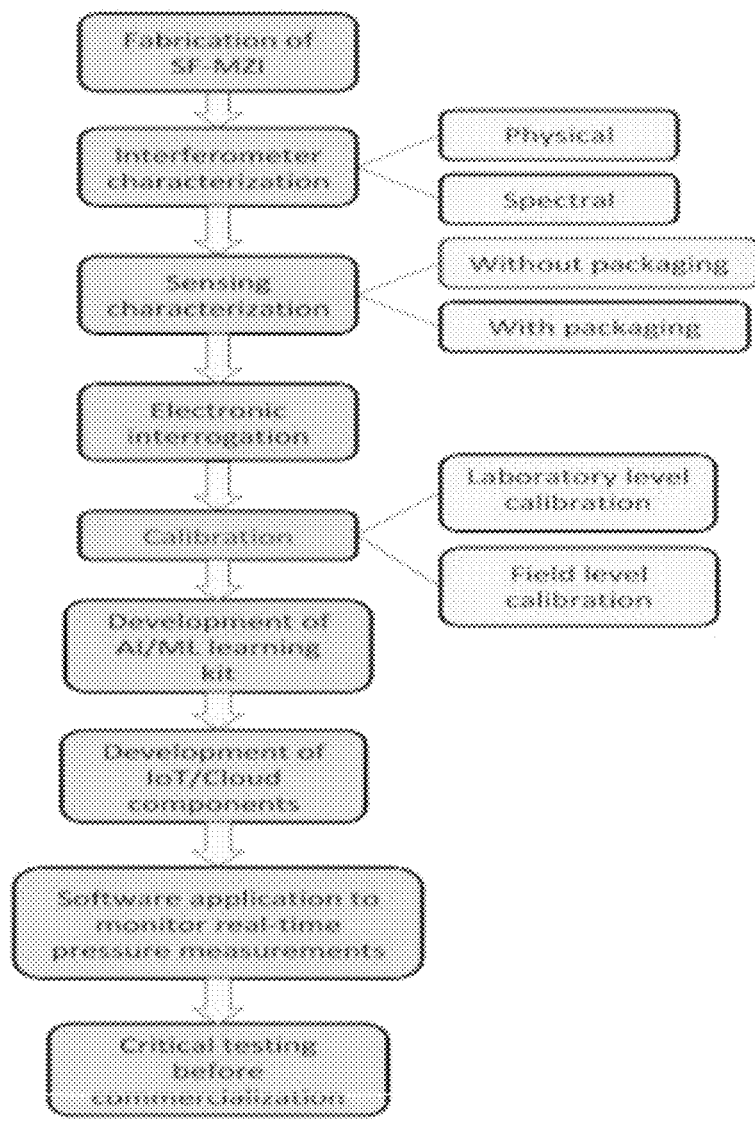
FIG. 7 is a schematic diagram of one embodiment of a method of the present disclosure.

In a further experimental set-up, an air compressor with a storage tank is connected to a closed PVC pipe with a clamping unit, designed to measure strain variation of the pipe having fluid due to compression or expansion of the pipe. The diameter of the pipe changed by ~. 5 mm. Both increasing or decreasing the diameter of the pipe were simulated by loading and unloading the air inside the pipe. For measuring the diameter of the pipe under different loading conditions, a strain gauge was attached to the pipe outer surface. Shift in wavelength was also found to vary linearly with decrease/increase in diameter of the pipe. This is depicted in FIG. 5.

Sensing characterization experiments were also carried out. In these examples, the light beam emanating from the output of the SF-MZI was detected by an interrogator/optical spectrum analyzer. This data is then communicated to the AI coupled network for processing and to develop interferometer characterization equations for building the A.I model.

Although the present disclosure has been described and illustrated with respect to preferred embodiments and preferred uses thereof, it is not to be so limited since modifications and changes can be made therein which are within the full, intended scope of the disclosure as understood by those skilled in the art.

The invention claimed is:

1. A system for measuring pressure inside a pipeline or pressure vessel, said system comprising:
    a. one or more units locatable around an external surface of the pipeline or vessel, each unit containing:
        i. a light source for generating a light beam;
        ii. a single fiber Mach Zehnder interferometer (SF-MZI) sensor wrappable and bendable against an outer surface of the pipeline or vessel, for receiving the light beam;
        iii. a light receiver for receiving the light beam from an output of the SFMZI sensor, said light receiver including an optical spectral analyzer; and
        iv. a local processor for signal conversion;
    b. a data acquisition system associated with each of the one or more units to provide power to the elements of the unit; and
    c. a central processor in communication with each of the local processors of each of the units, said central processor containing stored pipeline or vessel strain data, and the stored bend induced birefringence data,
    wherein the optical spectral analyzer is configured to detect a change in spectral pattern of light travelling from the light source through the SF-MZI sensor, said spectral pattern change corresponding to a change in pressure within the pipeline or vessel; and
    wherein the central processor is configured to process the spectral pattern changes to calculate changes in strain in the pipeline or vessel and to calculate bend induced birefringence of the SF-MZI and is further configured to calibrate the calculated change in strain values by comparing the calculated strain data to the stored strain data and further calibrates the calculated bend induced birefringence values by comparing the calculated bend induced birefringence to the stored bend induced birefringence data, to determine whether a change in pressure has occurred within the pipeline or vessel.

2. The system of claim 1, wherein the SF-MZI sensor includes at least two non-adiabatic biconical tapered fibers separated by an un-tapered interference region through which the light beam travels from light source to light receiver.

3. The system of claim 2, wherein the SF-MZI sensor is configured to axially deform due to tensile stress in the pipeline or vessel and wherein the bending of SF-MZI around the pipeline or vessel induces additional birefringence inside the tapered regions and un-tapered interference region.

4. The system of claim 3, further comprising an artificial intelligence (AI)/machine learning (ML) learning kit coupled to the central processor.

5. The system of claim 4, wherein the system is characterized and calibrated prior to use using the stored pipeline or vessel strain data, and the stored bend induced birefringence data.

6. The system of claim 5, wherein the system is further characterized and calibrated during operational use by through the AI/ML learning kit that is configured to learn autonomously during usage.

7. The system of claim 6, wherein the central processor is enabled with internet of things (IoT) and cloud components and software applications to monitor real-time changes in pipeline or vessel pressure.

8. The system of claim 7, wherein the optical spectral analyzer detects the light beam emanating from the output of the SF-MZI sensor and transmits spectral change data to AI-coupled central processor for processing the data from the optical spectral analyzer to determine the corresponding change in strain in the pipeline or vessel.

9. The system of claim 1, wherein the stored strain data includes strain data profiles for pressure variations.

10. The system of claim 1, wherein the stored bend induced birefringence data profiles including bend induced birefringence data profiles.

11. The system of claim 1, wherein the data acquisition system comprises solar panels to provide power to the one or more units and wherein the data acquisition system is orientable to face the sun.

12. The system of claim 1, wherein the one or more units comprise a watertight seal at a mating surface with the outer surface of the pipeline or vessel and wherein the one or more units are further secured to the outer surface of the pipeline or vessel with a strap.

13. The system of claim 1, wherein the light source is a light-emitting diode (LED) emitting light in the range of 1520 nm to 1570 nm.

14. A method of for measuring pressure inside a pipeline or pressure vessel, said method comprising the steps of:
   a. bending and wrapping a SF-MZI sensor around the pipeline or vessel;
   b. emitting a light beam into an input of the SF-MZI sensor and allowing the light to travel through a first tapered region, an un-tapered interference region and a second tapered region of the SF-MZI sensor;
   c. receiving the light beam from an output of the SF-MZI sensor into an optical spectral analyzer;
   d. detecting, by the optical spectral analyzer any change in a spectral pattern in real-time;
   e. processing the spectral pattern changes to calculate changes in strain in the pipeline or vessel;
   f. calculating bend induced birefringence of the SF-MZI;
   g. calibrating the calculated change in strain values by comparing the calculated strain data to the stored strain data; and
   h. calibrating the calculated bend induced birefringence values by comparing the calculated bend induced birefringence to the stored bend induced birefringence data, to determine whether a change in pressure has occurred within the pipeline or vessel.

15. The method of claim 14, wherein bending of SF-MZI sensor around the pipeline or vessel induces additional birefringence inside the tapered regions and un-tapered interference region.

16. The method of claim 15, further comprising the steps of calibrating and characterizing parameters of the method by artificial intelligence (AI) and machine learning (ML) learning.

17. A characterization method for calibration of the SF-MZI sensor of the system of claim 1, said characterization method comprising the steps of:
   a. generating a unique number; and
   b. assigning the unique number to each configuration of the optical interferometer;
wherein the unique number is constant; and the unique number makes the sensing process independent of profiles of tapers constituting the optical interferometer.

18. The characterization method of claim 17, wherein the characterization is used to determine sensitivity of the sensor and determine any amplitude or temperature corrections required.

19. The characterization method of claim 17, wherein the method can be carried out at the physical level or spectral level.

* * * * *